July 24, 1962
M. J. FULTON
3,045,830
LIQUID DISPERSION SEPARATING DEVICE
Filed April 29, 1958
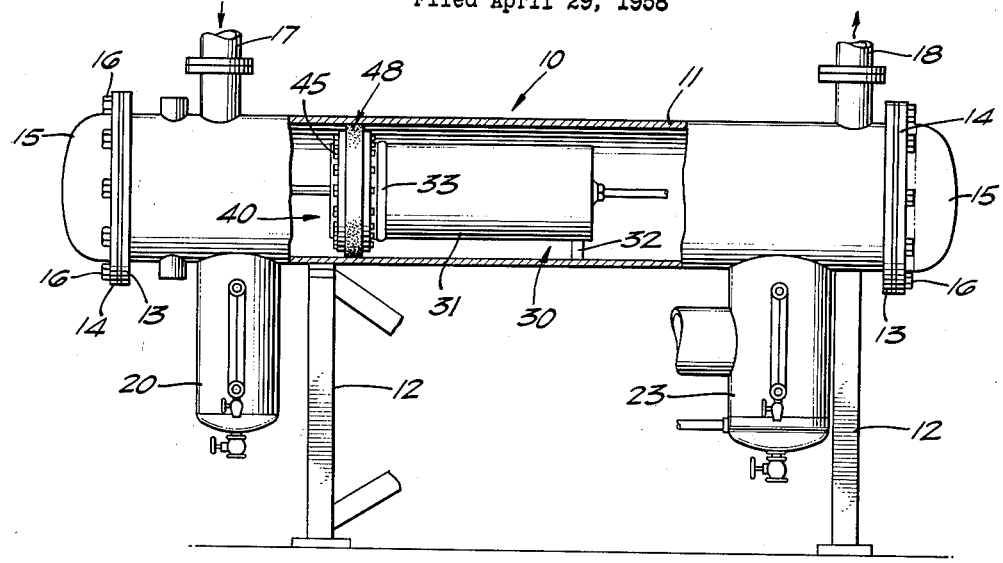
FIG. 1.
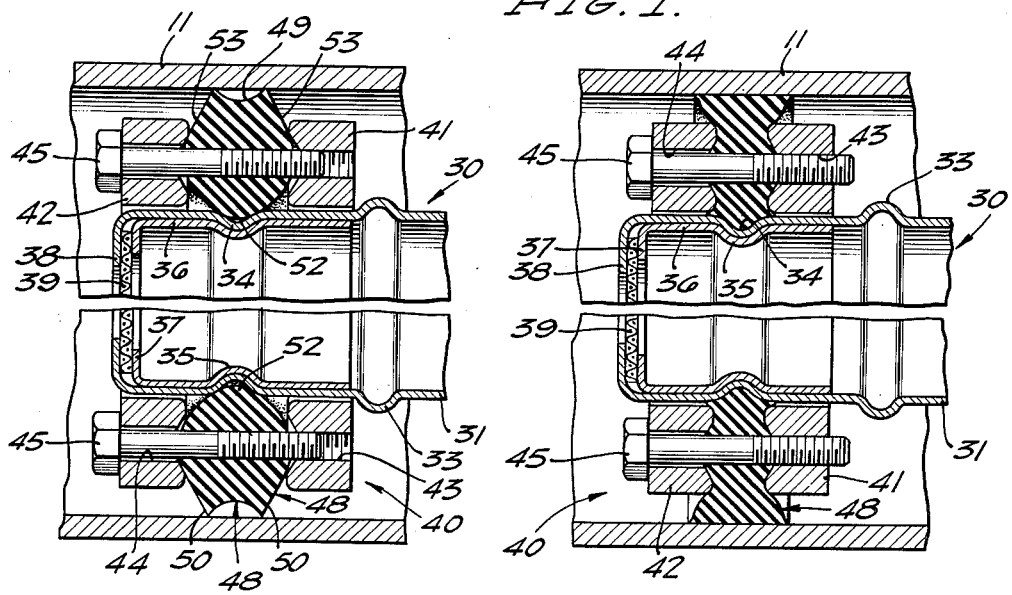
FIG. 2.
FIG. 3.
MERVIN J. FULTON
INVENTOR.
BY
ATTORNEY

3,045,830
LIQUID DISPERSION SEPARATING DEVICE
Mervin J. Fulton, P.O. Box 980, Tulare, Calif.; Leota Williamson Fulton executrix of said Mervin J. Fulton, deceased
Filed Apr. 29, 1958, Ser. No. 731,729
4 Claims. (Cl. 210—232)

This invention relates to liquid dispersion separating devices and more particularly to an improved filter cartridge featuring an improved detachable coupling and seal assembly for use in mounting the cartridge in fluid-tight relation to an enclosing housing therefor.

The subject matter of the present invention deals with the type of liquid separating device and filter cartridge disclosed in the co-pending application for United States Letters Patent Serial No. 646,251, filed March 15, 1957, by Mervin J. Fulton and Thomas J. Fulton, now Patent No. 2,858,027, entitled Liqud Dispersion Separating Device.

The filter cartridges there disclosed and with which the present invention is used are of a type having a gross weight of approximately 150 pounds and an outer diameter of approximately two feet. These filters are commonly housed intermediate the ends of a long, generally horizontally-disposed cylindrical housing having a relatively smooth internal bore, the filter cartridge being accessible for servicing and replacement through the removable end cap of the cylindrical housing. The problem presented is that of providing a fluid-tight seal and anchorage coupling between the filter cartridge and the bore of the housing and which can be expanded and contracted remotely through the open end of the housing. Owing to the very considerable pressure differential across the filter in normal operation, the anchorage provided must be capable of withstanding the high shear stresses imposed by the pressure differential and hold the filter against displacement axially of the housing by reason thereof as well as being effective to prevent leakage therepast.

The combined sealing and mounting assembly for such filter cartridge applications as heretofore provided are characterized by being permanently attached to the filter cartridge with the result that these costly mounting assemblies must be discarded along with the cartridge when the filter becomes too clogged for further use. According to the present invention, this costly practice is avoided in that the mounting ring and sealing assembly is so constructed as to be readily detachable from an unserviceable filter and attached to a new filter for reuse in mounting the filter in its operating environment. Accordingly, by the expedients herein disclosed a mounting and sealing assembly of the present invention is reusable repeatedly throughout the service lives of many filter cartridges. In fact, the mounting rings may be used indefinitely and it is only necessary to replace the resilient sealing gasket from time to time. A salient feature of the design is the provision of a coupling assembly wherein the gasket ring is expanded radially inwardly and outwardly into sealing engagement respectively, with the cartridge and with the surrounding housing for the cartridge. By this expedient, it is unecessary to provide special means for holding the mounting assembly detachably to the filter cartridge. Rather, the side wall of the cartridge is provided with an annular outwardly opening groove in which the inner periphery of the gasket ring seats. Rigid rings provided on the opposite side faces of the gasket are arranged to be drawn toward one another to compress the gasket forcing it to expand inwardly and outwardly to provide both a fluid-tight seal and a strong frictional anchorage between the cartridge and its housing.

Accordingly, it is a primary object of the invention to provide a disposable filter cartridge featuring an improved, reusable mounting and sealing assembly for use in anchoring the filter cartridge in an operating position intermediate the ends of a smooth bore enclosing housing and lacking grooves, flanges or the like adapted to interlock mechanically with the mounting assembly.

Another object of the invention is the provision of a reusable readily detachable anchoring and sealing ring assembly which can be transferred from one disposable filter cartridge to another without need for additional fastening devices of any kind.

Another object of the invention is the provision of a mounting and sealing ring assembly utilizing a resilient sealing gasket adapted to be expanded radially in opposite directions to provide a seal and anchorage between two concentrically arranged walls.

Another object of the invention is the provision of an improved readily expansible sealing gasket.

These and other more specific objects will appear upon reading the following specification and claims and upon considering in connection therewith the attached drawing to which they relate.

Referring now to the drawing in which a preferred embodiment of the invention is illustrated:

FIGURE 1 is an elevational view with parts broken away showing a filter cartridge incorporating the present invention and installed within an enclosing housing;

FIGURE 2 is an enlarged fragmentary transverse sectional view showing the filter cartridge anchorage assembly in readiness for clamping in its installed operating position; and FIGURE 3 is a view similar to FIGURE 2 but showing the position of parts after the seal has been substantially fully expanded into sealing engagement with the concentrically arranged walls to either peripheral edge thereof.

Referring to FIGURE 1, there is shown a separator designated generally 10 having a long, relatively smoothbore cylindrical housing 11 suitable supported as upon pedestals 12,12, the opposite ends of housing 11 being provided with radial flanges 13, 13 to which the flanged rims 14 of end caps 15 are detachably secured in fluid-tight manner by cap screws 16. The inflowing contaminated liquid enters through a conduit 17 and the filtered fluid is exhausted through conduit 18. Heavier contaminants of the incoming liquid settle into a sump chamber 20 having a normally closed cleaning valve 21. A generally similar sump chamber 23 carried on the underside of the housing at its outlet end serves a similar purpose. Inasmuch as the sump chambers per se form no part of the present invention and are well known in the art, a more detailed description of them will be unnecessary.

The replaceable filter cartridge designated generally 30 comprises an open-ended generally cylindrical shell 31 appreciably smaller in diameter than separator housing 11. Suitably supported and arranged interiorly of shell 31 is filtering material such as excelsior, glass-wool, granular solids, or the like, preferably so disposed so as to produce a minimum pressure gradient between the opposite ends of the filter and maximum filtering effectiveness. The filter cartridge is designed for installation from the left-hand end of housing 11 as viewed in FIGURE 1 and its inner or forward end includes a supporting strut 32, its lower end preferably being rounded to facilitate sliding of the filter unit along the inner surface of housing 11. Similar struts may extend radially from the opposite sides of the cartridge to assure centering of its forward end within the separator housing.

As is made clear by FIGURES 2 and 3, the shell 31 of the filter cartridge is preferably formed from sheet metal. Desirably, the end to which the anchorage and sealing assembly is to be attached is provided with an outwardly extending annular bead 33 which serves as means for strengthening the cartridge side wall as well as for positioning the sealing gasket of the mounting ring assembly in its proper position prior to being tightened as will be explained more fully presently. Shell 31 is also provided with an inwardly extending bead 34 which is nested into a similar bead 35 formed in a retainer and reinforcing ring 36. The latter ring has an inturned flange 37 cooperating with an inturned flange 38 of shell 31 to hold a screen 39 in place across the inlet end of the filter cartridge. It will be understood that ring 36 aids in reinforcing the adjacent portions of cartridge 31 generally, and in particular, against the strong crushing action of the sealing gasket used in achoring the filter in its operating position.

The filter mounting and sealing assembly designated generally 40 comprises a pair of continuous rigid rings 41 and 42 of similar shape and size, each having an inner diameter slightly larger than the outer diameter of the filter cartridge and an outer diameter appreciably less than the internal bore diameter of housing 11. Ring 41 is provided with a plurality of threaded bores 43 distributed circumferentially thereof and registerable with similar but unthreaded bores 44 formed in ring 42. Seated within these bores are cap screws 45 which are effective in drawing rings 41 and 42 together as will be described more fully presently.

The elastomeric sealing ring designated generally 48 forming an important feature of this invention is shown in its normal relaxed condition in FIGURE 2. It will be understood that, in cross-section, this ring is generally egg-shaped except that its smaller outer end is cut away to form a concave groove 49 having sharp edged annular lips 50 along either edge. The normal relaxed diameter of the sharp edges of lips 50 is slightly less than the internal diameter of the bore of separator housing 11. It is also pointed out that the rounded inner peripheral edge 52 of resilient ring 48 preferably has a snug fit with the groove formed by bead 34. It will also be observed that the lateral side edges 53 of the sealing ring bulge outwardly away from one another so that the ring has its maximum axial thickness opposite the faces of clamping rings 41, 42.

The operation of the described construction will be quite apparent from the foregoing detailed description of the essential components. To install a new filter cartridge 30 within separator housing 11, it is first necessary to remove end cap 15 from the left-hand end as viewed in FIGURE 1. The new cartridge with the anchoring and sealing assembly 40 assembled to the left-hand end of the cartridge and with the components thereof in their expanded position shown in FIGURE 2 is then slid endwise into the open end of the housing, the forward end being supported on strut 32 and care being exercised to hold the rear end of the cartridge centered in any suitable manner during movement of the cartridge along the housing to avoid damaging the sealing ring. Although the anchorage assembly is not shown as provided with special means for this purpose, it will be understood that, if desired, the outer ring may be provided with a plurality of lugs and adjustable screws designated 55 and 57, respectively, in my copending application being filed concurrently herewith. Alternatively, the rear end of the filter cartridge may be supported temporarily on a special dolly tool while being moved into position. Following expansion of the clamping means, the special tool is removed.

Desirably, the rear end of the cartridge is held centered concentrically of housing 11 while cap screws 45 are being gradually tightened in stages thereby drawing rings 41 and 42 together against the opposite sides of sealing gasket 48. When the rings have been properly and fully tightened, the rings will have been expanded radially inwardly into groove 34 as well as outwardly into wide area frictional contact with the bore of housing 11 effectively sealing any depressions or imperfections therein, the cross-sectional shape of the gasket then being that generally indicated in FIGURE 3. It will be observed that rings 41 and 42 are preferably provided with dished recesses about the shank of cap screws 45, this shape facilitating the compressing of the gasket into firm sealing contact with the shank and threaded portions of cap screws 45. Owing to the very slight radial space between the inner and outer peripheries of rings 41 and 42 and the juxtaposed side walls of cartridge 30 and housing 11, it is found that the gasket is fully supported and highly effective in holding the cartridge centered in the housing in sealing relation to the side walls thereof as well as effective in preventing displacement of the cartridge axially of the housing due to the pressure differential across the filter.

Once the filter has been properly anchored as described, end cap 15 is replaced and the separator is ready for operation in the usual manner. When the filter cartridge 30 is in need of servicing or replacement, end cap 15 is again removed and clamping screws 14 are loosened allowing the gasket ring to contract to its normal neutral position as shown in FIGURE 2. The cartridge is then removed and the anchorage assembly 40 is transferred to a fresh cartridge 30, care being taken to have inner ring 41 abut bead 33 on the new cartridge thereby assuring the centering of the gasket ring opposite the outwardly opening bead 34. This correct positioning of the components may be quickly checked when the filter cartridge is in its desired operating position and before closure of the clamping rings by striking outer ring 42 to drive inner ring 41 firmly against positioning bead 33. The clamp is then ready for tightening by means in the manner previously described.

From the foregoing it will be apparent there has been provided by the described invention a simplified and inexpensive disposable filter assembly in which the entire anchoring and sealing ring assembly 40 is quickly removable from and reassembled to another cartridge to the end that this assembly may be reused repeatedly. Should the sealing gasket become damaged or deteriorate after long use it is easily replaced with a new one.

While the particular reusable anchorage and sealing assembly for disposable filter cartridges herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:
1. In a heavy duty fluid filter assembly of the type having an elongated tubular main housing with a smooth interior surface free of inwardly extending projections and normally fully connected to its operating environment, a disposable filter cartridge having a tubular main housing of appreciably smaller diameter than the inner diameter of said main housing and adapted to be mounted concentrically within the latter, one end of said outer housing having a removable closure through which said filter cartridge can be installed and withdrawn; that improvement which comprises a unitary anchorage ring and seal assembly adapted to be reused with successive filter cartridges to anchor the same against axial displacement lengthwise of said main housing despite the existence of substantial pressure differentials across the opposite ends of said filter cartridge, said anchorage and seal assembly being effective to seal off the annular space between said filter cartridge and said main housing and comprising a pair of similar rigid rings having an inner diameter slightly greater than the diameter of a filter cartridge and an outer diameter slightly less than the inner diameter of said cylindrical housing, a thick elas- tomeric gasket ring between said rings having an inner diameter approximately that of said cartridge and a relaxed outer diameter having a loose sliding fit with the interior of said housing, said gasket ring being provided with a plurality of sharp-edged annular ridges spaced apart axially of said gasket, a plurality of adjustable means extending through the bodies of said rigid rings and of said gasket ring for compressing said rigid rings against the opposite faces of said gasket ring to expand the same radially into wide area frictional and sealing contact with the exterior surface of said cylindrical housing thereby anchoring said cartridge against displacement axially of said housing.

2. In combination, a disposable filter cartridge having a generally cylindrical shell open at its opposite ends for the passage therethrough of a medium to be filtered, said cartridge being adapted to be removably supported concentrically within a tubular housing of greater diameter and having a smooth unobstructed interior surface, an annular anchorage and sealing ring assembly arranged between said cartridge and the interior side wall of said housing for releasably securing said cartridge in place therein at any of many positions axially of said tubular housing and to be anchored in such position despite substantial pressure drop across said filter, said assembly including a thick resilient gasket ring having a radial width corresponding substantially to the radial spacing between said cartridge and said housing, said gasket ring when relaxed having outwardly bulging side walls as well as an inwardly bulging rounded contour about its inner periphery and a plurality of axially spaced annular ribs on its exterior periphery said gasket being positioned between a pair of rigid rings provided with clamping means for drawing the same together, said clamping means being adjustable to compress said gasket axially thereof to expand the same radially against both said cartridge shell and said tubular housing to anchor the cartridge in place in a fluid-tight manner.

3. The combination defined in claim 2 characterized in that said filter cartridge shell has an outwardly opening annular groove therein disposed opposite said gasket ring and into which said ring is firmly compressed by said rigid rings when tightly compressed against the opposite faces of said gasket.

4. The combination defined in claim 2 characterized in that said gasket ring in its normal relaxed condition has outwardly bulging end faces and an inwardly bulging inner surface, the outer periphery of said ring having a plurality of axially spaced sharp-edged annular ribs projecting radially outwardly therefrom and separated from one another by intervening groove means to facilitate outward expansion of said gasket ring into axially-spaced annular surface areas of said tubular filter housing.

References Cited in the file of this patent

UNITED STATES PATENTS

| | | |
|---|---|---|
| 569,247 | Smith | Oct. 13, 1896 |
| 1,851,939 | Williams | Mar. 29, 1932 |
| 1,951,940 | Williams | Mar. 29, 1932 |
| 2,256,145 | Hock | Sept. 16, 1941 |
| 2,468,382 | Taylor | Apr. 26, 1949 |
| 2,605,901 | Morrison et al. | Aug. 5, 1952 |
| 2,735,697 | Zanin | Feb. 21, 1956 |